(12) United States Patent
Wee et al.

(10) Patent No.: US 11,290,752 B2
(45) Date of Patent: Mar. 29, 2022

(54) METHOD AND APPARATUS FOR PROVIDING FREE VIEWPOINT VIDEO

(71) Applicant: KOREA ELECTRONICS TECHNOLOGY INSTITUTE, Seongnam-si (KR)

(72) Inventors: Jung Wook Wee, Seoul (KR); Seul Ki Song, Seoul (KR)

(73) Assignee: KOREA ELECTRONICS TECHNOLOGY INSTITUTE, Seongnam-si (KR)

(*) Notice: Subject to any disclaimer, the term of this patent is extended or adjusted under 35 U.S.C. 154(b) by 77 days.

(21) Appl. No.: 16/699,274

(22) Filed: Nov. 29, 2019

(65) Prior Publication Data

US 2020/0177929 A1    Jun. 4, 2020

(30) Foreign Application Priority Data

Nov. 30, 2018    (KR) .................... 10-2018-0152471

(51) Int. Cl.
*H04N 21/218*    (2011.01)
*H04N 21/239*    (2011.01)
*H04N 21/235*    (2011.01)

(52) U.S. Cl.
CPC ..... *H04N 21/21805* (2013.01); *H04N 21/235* (2013.01); *H04N 21/2393* (2013.01)

(58) Field of Classification Search
CPC ... H04W 72/042; H04W 52/34; H04W 24/02; H04W 52/24; H04W 16/32; H04W 72/085; H04W 24/08; H04W 72/0453; H04W 72/046; H04W 72/0486; H04N 19/597; H04N 13/117; H04N 5/247; H04N 13/111; H04N 21/21805; H04N 13/282; H04N 19/46; H04N 21/6587; H04N 5/23206; H04N 7/181; H04N 13/279; H04N 13/178;
(Continued)

(56) References Cited

U.S. PATENT DOCUMENTS 5,262,867 A * 11/1993 Kojima .................... G01S 5/18
348/39
6,677,982 B1 * 1/2004 Chen .................... G06T 3/4038
348/36
(Continued)

FOREIGN PATENT DOCUMENTS

KR    10-2012-0133011 A    12/2012
KR    10-2016-0112898 A    9/2016
KR    10-2017-0062376 A    6/2017

OTHER PUBLICATIONS

D. You, B. Seo, E. Jeong and D. H. Kim, "Internet of Things (IoT) for Seamless Virtual Reality Space: Challenges and Perspectives," in IEEE Access, vol. 6, pp. 40439-40449, 2018, doi: 10.1109/ACCESS.2018.2829194. (Year: 2018).*
(Continued)

*Primary Examiner* — Cynthia M Fogg
(74) *Attorney, Agent, or Firm* — Hauptman Ham, LLP (57) ABSTRACT

Provided is a method of providing a plurality of images on the basis of meta information about a free viewpoint relation. In this case, the plurality of images includes a reference image and a surrounding image. Accordingly, a user at a remote site may view one piece of content at various viewpoints and the accessibility and convenience of use may be improved.

3 Claims, 6 Drawing Sheets

(58) Field of Classification Search
CPC ............. H04N 5/23299; H04N 13/349; H04N 21/4223; H04N 21/235; H04N 21/2393; H04N 21/26258; H04N 21/23418; H04N 21/23614
USPC .......................................................... 725/86
See application file for complete search history.

(56) References Cited

U.S. PATENT DOCUMENTS

| | | | | |
|---|---|---|---|---|
| 10,965,928 | B2* | 3/2021 | Lee | H04N 21/21805 |
| 2006/0115181 | A1* | 6/2006 | Deng | G06T 3/0075 |
| | | | | 382/284 |
| 2009/0309987 | A1* | 12/2009 | Kimura | H04N 21/2343 |
| | | | | 348/218.1 |
| 2017/0034501 | A1* | 2/2017 | McDevitt | H04N 5/232 |
| 2017/0155572 | A1* | 6/2017 | Ge | G06K 9/52 |
| 2018/0152688 | A1* | 5/2018 | Graziosi | G06T 15/04 |
| 2018/0261254 | A1* | 9/2018 | Wang | H04N 21/816 |
| 2019/0253743 | A1* | 8/2019 | Tanaka | H04N 21/812 |
| 2020/0045286 | A1* | 2/2020 | Boyce | H04N 13/344 |

OTHER PUBLICATIONS

S. Song, Y. Kim, Y. Park and J. Wee, "Free-Viewpoint Relationship Description Based Streaming Systems for Arbitrary View Switching," 2018 Tenth International Conference on Ubiquitous and Future Networks (ICUFN), 2018, pp. 738-740, doi: 10.1109/ICUFN.2018.8436845 (Year: 2018).*

Ahmed Hamza et al., "Adaptive Streaming of Interactive Free Viewpoint Videos to Heterogeneous Clients", MMSys', May 10-13, 2016, Klagenfurt, Austria.

Information technology—Dynamic adaptive streaming over HTTP (DASH)—Part 1: Media presentation description and segment formats, 3rd Edition, ISO/IEC 230090-1:2014(E), ISO (International Organization for Standardization)/IEC (International Electrotechnical Commission), Switzerland.

* cited by examiner

METHOD AND APPARATUS FOR PROVIDING FREE VIEWPOINT VIDEO

CROSS-REFERENCE TO RELATED APPLICATION

This application claims priority to and the benefit of Korean Patent Application No. 2018-0152471, filed on Nov. 30, 2018, the disclosure of which is incorporated herein by reference in its entirety.

BACKGROUND

1. Field of the Invention

The present invention relates to a method and apparatus for providing a free viewpoint video, and more specifically, to an apparatus and method for providing a free viewpoint video on the basis of meta information about a free viewpoint relation.

2. Discussion of Related Art

Free choice viewpoint video services are services for providing cultural content, such as performances and sports, such that the content is viewed from a viewpoint desired by a user. The free choice viewpoint video services are aimed to provide content corresponding to the movement of a viewpoint of a user who is watching an image. For example, the free choice viewpoint video service allows content to be consumed from multi-viewpoints by providing a smooth movement, such as a panoramic view, or providing a movement to an arbitrary location such as from an auditorium to a stage or an arena.

The conventional free choice viewpoint video service technology has been actively achieved in detail fields, such as free viewpoint video (FVV) photographing technique, FVV data processing technique, image synthesis technique, and 3D modeling technique.

However, in the conventional technology, little research has been conducted on the technology of streaming an FVV in a network environment. When a video may be provided only to an onsite user who can take the FVV service, the service environment is extremely limited and low in accessibility.

SUMMARY OF THE INVENTION

The present invention provides a method and apparatus for providing a free viewpoint video in a network environment. To this end, a meta information structure for a free viewpoint relation based on MPEG-Dynamic Adaptive Streaming over HTTP (DASH) is proposed, and a method and apparatus for providing a free viewpoint video on the basis of a corresponding meta information is presented.

The technical objectives of the present invention are not limited to the above, and other objectives may become apparent to those of ordinary skill in the art based on the following descriptions.

According to one aspect of the present invention, there is provided a method of providing a plurality of images including a reference image and a surrounding image on the basis of meta information, the method including acquiring photographing position information of the plurality of images, determining the reference image on the basis of the photographing position information, generating meta information of the reference image, generating meta information of the surrounding image, and transmitting the meta information of the reference image and the meta information of the surrounding image according to a request of a user.

According to another aspect of the present invention, there is provided a method of providing a plurality of images including a reference image and a surrounding image on the basis of meta information, the method including receiving meta information of the reference image and meta information of the surrounding image, acquiring viewpoint information of a user, selecting one piece of meta information among the received pieces of meta information on the basis of the viewpoint information of the user, and providing the user with an image corresponding to the selected meta information.

DETAILED DESCRIPTION OF EXEMPLARY EMBODIMENTS

Hereinafter, embodiments of the present invention will be described in detail with reference to the accompanying drawings so that those skilled in the art may easily carry out the present invention. The present invention may be embodied in various forms and is not to be construed as limited to the embodiments set forth herein. In the drawings, parts irrelevant to the description have been omitted for the clarity of explanation Meanwhile, when any part in the embodiments "includes" a certain component, it means that it may further include other components rather than exclude other components unless otherwise stated.

A free viewpoint video (FVV) is an image generated by photographing an object from a plurality of viewpoints, and a free choice viewpoint video service refers to a service that provides a user with an image corresponding to a current viewpoint of the user or a viewpoint desired by the user on the basis of the FVV Meanwhile, MPEG-Dynamic Adaptive Streaming over HTTP (DASH) is a transmission technology that enables one piece of content to be transmitted at various resolutions. In detail, MPEG-DASH is a streaming standard that divides an MPEG image into segments and delivers the MPEG image segments. The MPEG-DASH divides content into segments of predetermined lengths and allows a segment with a resolution having a transmission rate suitable for a network environment, such as a network transmission speed, or a user terminal environment to be selectively received among media file segments compressed at a variety of bit rates. To this end. MPEG-DASH defines image segment related information in a media presentation description (MPD) document.

The MPD of MPEG-DASH provides an initialization segment file required for initialization of a decoder and a URL for each media segment file. A DASH client first receives and parses an MPD file at the start of a DASH service so that a location of a decoder initialization file, provided bit rates, and a location of a media segment file corresponding to each bit rate may be identified.

Meanwhile, the current MPEG-DASH does not consider a method and structure for streaming free viewpoint video related information and does not include free viewpoint video related parameter information in an MPD.

Accordingly, the present invention provides a method and apparatus for providing a plurality of media segments to provide one piece of content and providing a free viewpoint video in a network environment on the basis of a structure of MPEG-DASH that allows a suitable media segment to be selectable according to a network environment or a user terminal environment. In particular, a meta information structure defines free-viewpoint relation description (FRD) on the basis of a MPD document of MPEG-DASH and provides a FVV.

Figure 1:
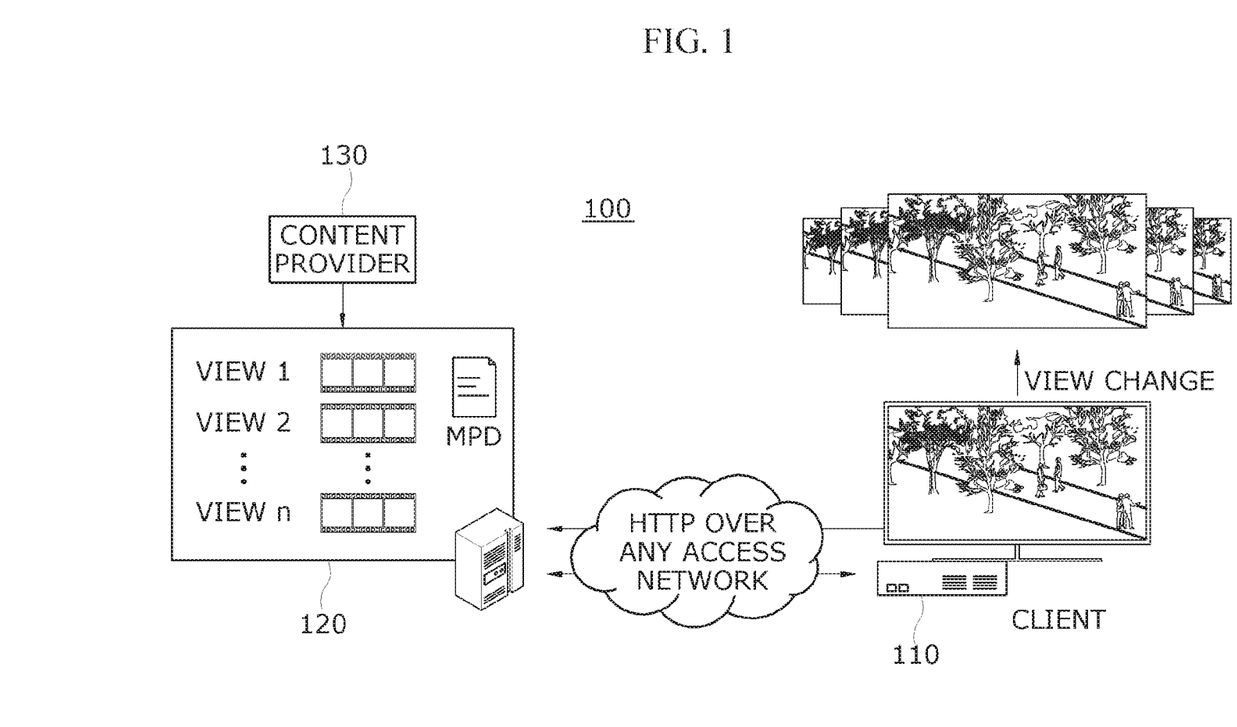
FIG. 1 is a schematic view illustrating a system (100) for providing an image according to an embodiment.

FIG. 1 is a schematic view illustrating a system 100X) for providing an image according to an embodiment.

The system 100 for providing an image includes a server 120 that provides a client 110 with a free viewpoint video requested by the client 110, and the client 110 that provides a user with an FVV. Meanwhile, a content provider 130 supplies the server 120 with an FVV.

The FVV includes at least one view. The view includes a plurality of images selected according to an image providing scenario. The image providing scenario is defined according to the arrangement of cameras photographing an object and the directions in which the cameras are directed. For example, the image providing scenario includes a panoramic view, a 360 degree view, an arbitrary position view, an inward object view, an outward object view, an inward scene view, and the like. For example, an FVV including N views (i.e., View 1, View 2, . . . , and View N) is illustrated in the server 120.

One view includes a plurality of images photographed in various directions and at various positions. For example, an inward object view includes a plurality of images photographed by cameras at a plurality of positions in directions in which the cameras looks at an object. An outward object view includes a plurality of images photographed by cameras at a plurality of positions in directions in which the cameras looks at the outside of an object. In another example, an inward scene view includes a plurality of images photographed by cameras at a plurality of positions disposed at a wide angle range with respect to the object in directions in which the cameras looks at an object.

As a result, one view includes a plurality of images, and each image is referred to as a sub-view. That is, one view includes a plurality of sub-views.

The server 120 stores photographing position information of a view as information about the view. Here, the photographing position information may include spatial information of a place in which an image of a performance hall or a stadium has been photographed, arrangement information of cameras, orientation information of cameras, three-dimensional position information of cameras, absolute position information of cameras, relative position information of cameras, the number of cameras, interval information of cameras, and the like, and may refer to information related to a position in which a view has been photographed.

The server 120 may analyze an FVV provided by the content provider 130 and extract photographing position information of each view constituting the FVV and including a plurality of images. Alternatively, the server 120 may be provided with photographing position information of each view from the content provider 130. The server 120 may map the acquired photographing information to each view. In one example, the server 120 may group a plurality of images into one view on the basis of the acquired photographing position information and determine an image providing scenario for the corresponding view.

The server 120 structures information about at least one view constituting an FVV to generate meta information about a free viewpoint relation. The meta information about the free viewpoint relation provides information for image translation according to movement of a user's viewpoint.

The server 120 generates meta information about a free viewpoint relation on the basis of information about each view and information about a plurality of images constituting each view. Here, the meta information about the free viewpoint relation may be structured on the basis of an MPD of MPEG-DASH.

The free viewpoint relation represents at least one view included in an FVV and a positional relation between a plurality of images included in each view. Here, the positional relation may be determined according to an image providing scenario and photographing position information of each view. Meta information about a free viewpoint relation is information in which the free viewpoint relation is structured and in which each view of the free viewpoint relation and a positional relation of a plurality of images are hierarchically structured.

The server 120 generates meta information about a free viewpoint relation of an FVV on the basis of photographing position information of each view. When the client 110 requests an FVV from the server 120, the server 120 provides the client 110 with the FVV on the basis of the meta information about the free viewpoint relation. A process of the server 120 providing an image will be described in detail below with reference to FIG. 2.

The client 110 receives the FVV and the meta information about the free viewpoint relation of the corresponding FVV from the server 120.

The client 110 performs image translation in the FVV according to movement of a user's viewpoint on the basis of the meta information about the free viewpoint relation received from the server 120. The client 110 acquires viewpoint information of a user who desires to watch an FVV and provides the user with an image corresponding to the acquired viewpoint information among a plurality of images constituting at least one view included in the FVV. In addition, in response to the viewpoint information of the user being changed (view change), the client 110 provides the user with an image corresponding to the changed viewpoint information. In this process, the client 110 uses the meta information about the free viewpoint relation of the FVV provided by the server 120. For example, the client 110 may represent various portable terminals, including a mobile phone and a tablet personal computer (PC), a television (TV), a set-top box, a notebook PC, and a desktop PC. For example, the client 110 may represent a wearable device, such as a head mounted display (HMD). A process of the client 110 providing an image will be described in detail below with reference to FIG. 5.

The request for the FVV and the provision of the FVV between the server 120 and the client 110 are performed by communication using a network. For example, the server 120 and the client 110 communicate with each other using Hypertext Transfer Protocol (HTTP).

Figure 2:
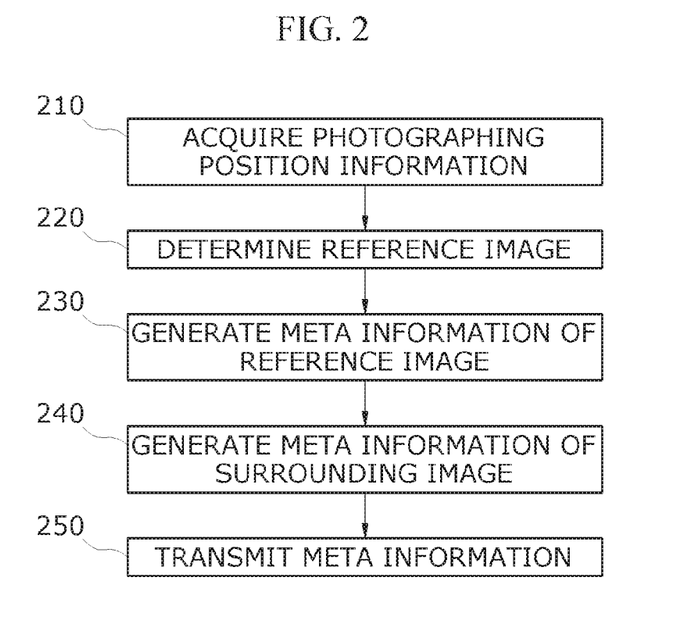
FIG. 2 is a flowchart illustrating a method of providing an image according to an embodiment.

FIG. 2 is a flowchart illustrating a method of providing an image according to an embodiment.

The server 120 provides the client 110 with a plurality of images on the basis of meta information about a free viewpoint relation. Here, the plurality of images provided by the server 120 correspond to a plurality of images constituting one of at least one view included in a free viewpoint image.

The view includes a reference image and a surrounding image. For example, a view includes one reference image and at least one surrounding image. That is, one of the plurality of images constituting the view is a reference image, and the remaining images among the plurality of images are surrounding images. For example, the surrounding images are images adjacent to the reference image.

Figure 3:
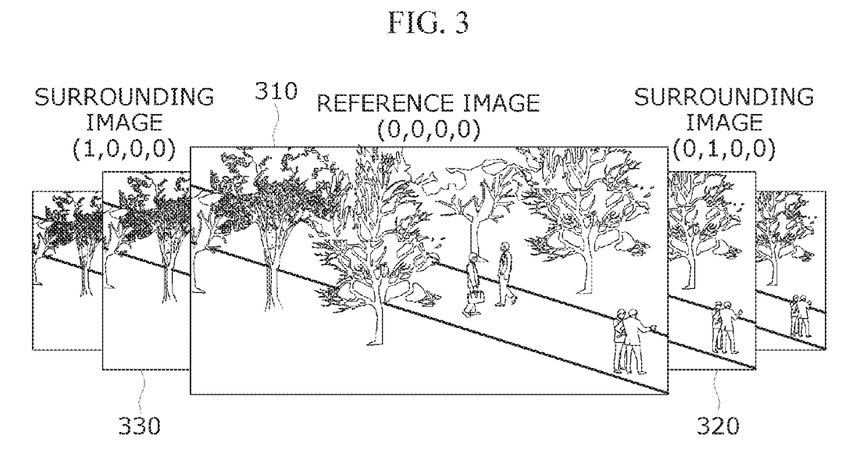
FIG. 3 is a view illustrating a reference image and a surrounding image.

Referring to FIG. 3, a reference image 310 and surrounding images 320 and 330 are illustrated. The reference image 310 is a reference for defining a relative position of each of a plurality of images constituting a view. That is, the relative positions of the surrounding images 320 and 330 are determined with respect to the reference image 310. For example, the relative position of the reference image 310 is the origin. For example, the surrounding image 320 is an image having a viewpoint that is moved one step to the right from the reference image 310. For example, the surrounding image 330 is an image having a viewpoint that is moved one step to the left from the reference image 310. Although the coordinates of the relative position are expressed in left, right, up, and down manners, this is for illustrative purposes only, and the relative position may be expressed in another way.

Referring again to FIG. 2, the server 120 acquires photographing position information of a plurality of images (210). As described above, the photographing position information includes spatial information of a place in which an image of a performance hall or an arena has been photographed, arrangement information of cameras, orientation information of cameras, three-dimensional position information of cameras, absolute position information of cameras, relative position information of cameras, the number of cameras, interval information of cameras, and the like, and refers to information related to a position in which an image has been photographed.

The server 120 determines a reference image among the plurality of images on the basis of the photographing position information acquired in operation 210 (220). For example, the server 120 determines an image located at the center as the reference image. In another example, the server 120 determines the leftmost image or the rightmost image as the reference image.

The server 120 generates meta information of the reference image determined in operation 220 (230). The meta information of the reference image includes an identifier for the plurality of images, photographing position information of the reference image, relative position information of the reference image, and server information of the reference image. The identifier for the plurality of images is an identifier of a view corresponding to the plurality of images. The server information of the reference image refers to information about a streaming server that is to actually provide the reference image and includes an address of the streaming server. The relative position information of the reference image is set as the origin.

The server 120 generates meta information of the surrounding images (240). The surrounding images correspond to the remaining images excluding the reference image determined in operation 220 among the plurality of images. The meta information of the surrounding image includes an identifier for the plurality of images, position information of the camera, and relative position information of the surrounding image. In addition, the meta information of the surrounding image may include photographing position information of the view to which the surrounding image belongs.

In operation 240, the server 120 determines relative position information of the surrounding image with respect to the reference image determined in operation 220 on the basis of the photographing position information acquired in operation 210. For example, the server 120 determines the relative position information of the surrounding image on the basis of the arrangement information of the cameras, the absolute position information of the cameras, and the interval information of the cameras included in the photographing position information.

The server 120 transmits the meta information of the reference image and the meta information of the surrounding image to the client 110 (250). For example, in operation 250, the server 120 transmits the meta information of the reference image and the meta information of the surrounding image to the client 110 according to a user's request. The client 110 receives the meta information of the reference image and the meta information of the surrounding image and structures meta information about a free viewpoint relation of the plurality of images including the reference image and the surrounding image. Here, the plurality of images including the reference image and the surrounding image correspond to one view of an FVV. As a result, the client 110 provides image translation according to movement of a user's viewpoint on the basis of the meta information about the free viewpoint relation. The process of the client 110 providing an image will be described in detail with reference to FIG. 5.

Figure 4A:
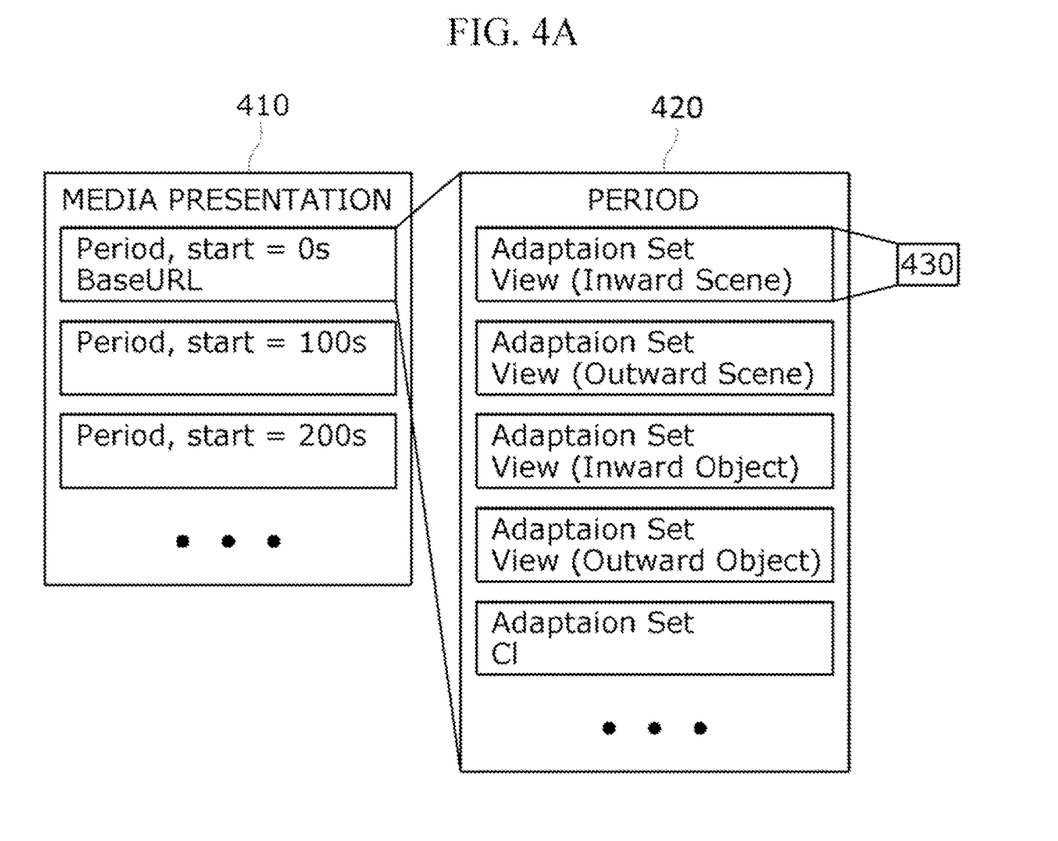
FIG. 4A and FIG. 4B is a view illustrating a meta information structure for a free viewpoint relation.
Figure 4B:
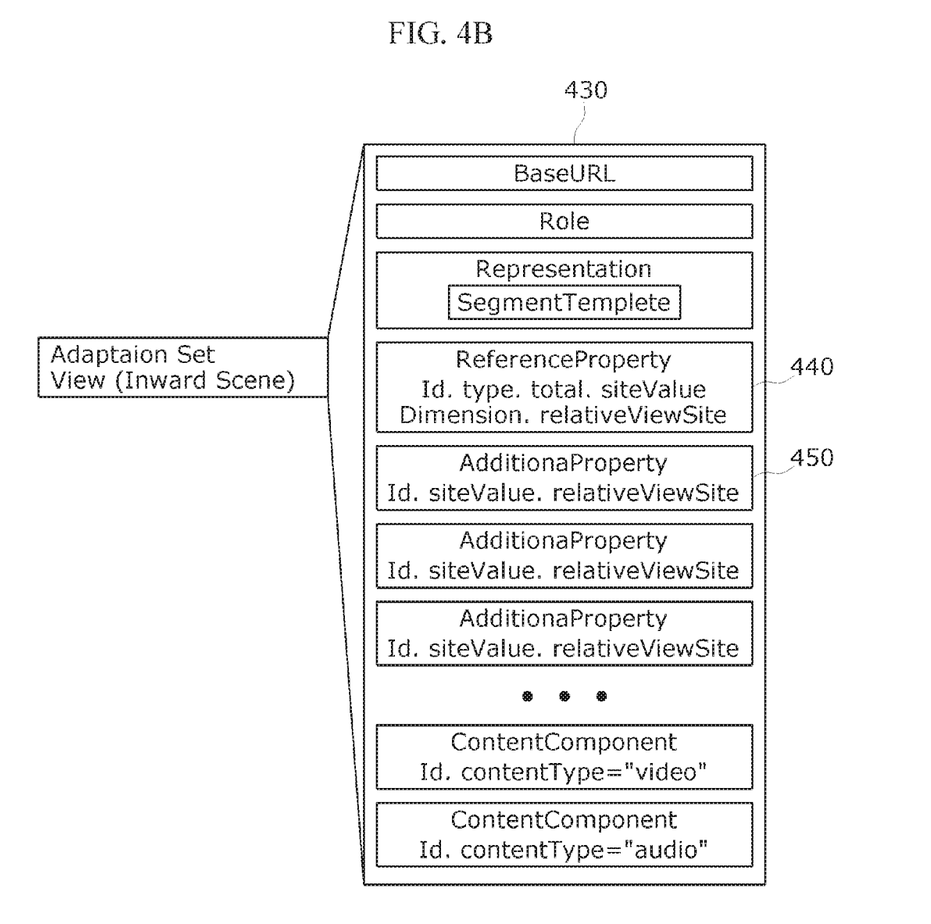

FIG. 4A and FIG. 4B is a view illustrating a meta information structure for a free viewpoint relation.

For example, meta information is structured on the basis of an Extended MPD (E-MPD) in which a server address of an image is added to an MPD of MPEG-DASH. That is, the meta information is structured on the basis of an E-MPD in which FRD is added to an MPD of MPEG-DASH.

Box 410 shows a series of segment definitions included in the MPD of MPEG-DASH. Each segment of box 410 may include an Adaptation Set as shown in box 420. In order to provide an FVV, each view of the FVV is defined as one Adaptation Set, and a plurality of sub-views, that is, a plurality of images constituting each view, are defined as FRD as shown in box 430. As shown in FIG. 4A and FIG. 4B, the FRD is defined as a sub element of the Adaptation Set, and accordingly, the plurality of images are hierarchically structured as sub elements of the view.

In box 430, the FRD includes a Reference Property 440 and an Additional Property 450. The Reference Property 440 corresponds to a reference image. The Additional Property 450 corresponds to a first surrounding image. Since a view includes one reference image and at least one surrounding image, a number of Additional Properties, representing surrounding images, included in the FRD corresponds to the number of the surrounding images. The reference image and the surrounding images are structured as sub-elements that constitute the FRD.

The Reference Property 440 corresponding to a reference image corresponds to a main image that represents a view among a plurality of images. The Reference Property 440 includes a property parameter for a view. For example, the Reference Property 440 includes photographing position information of a view. For example, the Reference Property 440 may include an identifier of a view, arrangement information of cameras at a time of photographing the view, the number of the cameras, position coordinates of the cameras, spatial coordinates of a place in which photography has been performed, dimensionality of coordinates of the cameras, and relative position information of a reference image. Here, the identifier of the view is information assigned to identify a plurality of images belonging to the same view, and a unique identifier for identifying a view is included in the Reference Property 440 of a reference image and the Additional Property 450 of a surrounding image in common.

The Additional Properties 450 corresponding to surrounding images include property parameters for the respective surrounding images. For example, the Additional Property 450 includes position information of a camera having photographed the surrounding image, relative position information of the surrounding image, and the like. Here, the relative position information of the surrounding image is determined on the basis of the Reference Property 440. For example, the Additional Property 450 includes photographing position information of a view to which the surrounding image belongs.

Tables 1 to 3 below illustrate parameters constituting meta information of a view of an FVV (Adaptation Set element semantics, box 420), parameters constituting meta information of a reference image (Reference Property element semantics, box 440), and parameters constituting meta information of a surrounding image (Additional Property Element semantics, box 450).

TABLE 1

<AdaptationSet element Semantics>

| Element or Attribute Name | Description |
| --- | --- |
| AdaptationSet | Adaptation Set description |
| | For details refer to 5.3.3 in ISO/IEC 23009-1 |
| @group | Identifier for the group |
| Role | Media component type information |
| | For details refer to 5.8.5.5 in ISO/IEC 23009-1 |
| ReferenceProperty | ReferenceProperty description |
| | For details refer to 2.2 |
| AdditionalProperty | AdditionalProperty description |
| | For details refer to 2.2 |

TABLE 2

<ReferenceProperty element Semantics>

| Element or Attribute Name | Description |
| --- | --- |
| ReferenceProperty | Specifies a ReferenceProperty |
| @id | Specifies the id of the FRD. |
| | This shall be unique within the same viewpoint |
| @type | Parallel, Curve, Halfsphere |
| @total | Number of cameras |
| @siteValue | Camera coordinates of the stage/stadium |
| @dimension | Dimension of camera coordinates |
| @relativeViewSite | Relative position of screen |
| @bandwidth | Consider a hypothetical constant bitrate channel of bandwidth with the value of this attribute in bits per second (bps) |

TABLE 3

<AdditionalProperty element Semantics>

| Element or Attribute Name | Description |
| --- | --- |
| AdditionalProperty | Specifies an AdditionalProperty |
| @id | Specifies the id of the FRD. |
| | This shall be unique within the same viewpoint |
| @siteValue | Camera coordinates of the stage/stadium |
| @relativeViewSite | Relative position of screen |
| @bandwidth | Consider a hypothetical constant bitrate channel of bandwidth with the value of this attribute in bits per second (bps) |

On the other hand, information required for FVV synthesis may be provided on the basis of the respective parameters of the meta information that define the free viewpoint relation as described above.

Figure 5:
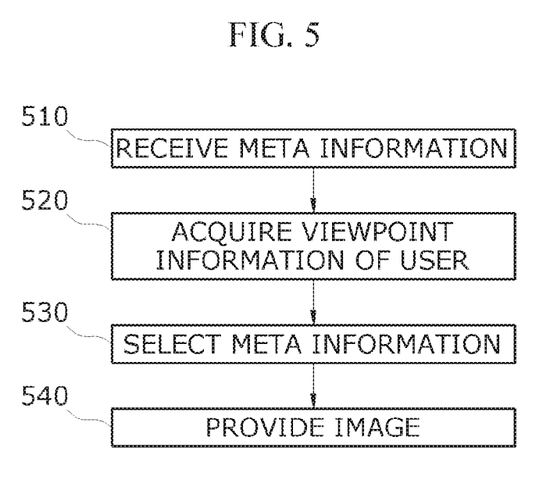
FIG. 5 is a flowchart illustrating a method of providing an image according to an embodiment.

FIG. 5 is a flowchart illustrating a method of providing an image according to an embodiment.

In FIG. 5, a process of providing a user with an image by the client 110 is shown by operations.

The client 110 receives meta information of a reference image and meta information of a surrounding image transmitted by the server 120 (510). That is, in operation 510, the client 110 receives meta information about a free viewpoint relation of a plurality of images constituting a view. In operation 510, the client 110 receives the meta information of the reference image and the meta data of the surrounding image, which are generated by the server 120 in operation 230 and operation 240 and transmitted from the server 120 to the client 110 in operation 250 as shown in FIG. 2.

The client 110 acquires viewpoint information of a user (520). For example, the viewpoint information of the user may be information about a viewpoint at which the user desires to watch the image, information about a viewpoint designated by the user, or information obtained by detecting a viewpoint at which the user currently views the image. For example, the client 110 may obtain the viewpoint information of the user from an external input device. The external input device may include a remote controller, a keyboard, a mouse, a sensor for detecting gaze information, or a sensor of a head mounted display (HMD).

The client 110 selects one piece of meta information among the plurality of pieces of meta information received from the server 120 in operation 510 on the basis of the viewpoint information of the user acquired in operation 520 (530).

The meta information of the surrounding image received from the server 120 in operation 510 includes relative position information of the surrounding image with respect to the reference image. That is, the server 120 determines relative position information of the surrounding image with respect to the reference image in operation 240 and generates meta information of the surrounding image in which the relative position information of the surrounding image with respect to the reference image is included as shown in FIG. 2.

In operation 530, the client 110 converts the viewpoint information of the user acquired in operation 520 into user position information with respect to the reference image. For example, when the viewpoint information of the user acquired in operation 520 is spatial absolute coordinates, the client 110 may convert the viewpoint information of the user into relative position information with respect to the reference image in operation 530. Here, the client 110 may convert the viewpoint information of the user into the user position information with respect to the reference image on the basis of the meta information of the reference image including the photographing position information of the view.

In operation 530, the client 110 may compare the user position information, which is obtained by converting the viewpoint information of the user acquired in operation 520, with the relative position information of the surrounding image included in the meta information of the surrounding image received in operation 510 and select one piece of meta information in which the user position information matches the relative position information of the surrounding image.

The client 110 provides the user with an image corresponding to the meta information selected in operation 530 (540). The image corresponding to the selected meta information is the reference image or the surrounding image. In this case, the client 110 provides the user with the image corresponding to the selected meta information using the server information of the reference image included in the meta information selected in operation 530.

Meanwhile, the client 110 reselects one piece of meta information among the pieces of meta information received in operation 510 in response to change of the viewpoint information of the user by performing operation 530 and provides the user with an image corresponding to the reselected meta information by performing operation 540.

Hereinafter, apparatuses for providing an image according to embodiments of the present invention will be described.

An apparatus for providing an image according to an embodiment includes a meta information generator that generates meta information about a free viewpoint relation, a storage that stores the meta information, and a communicator that performs communication with a client.

An apparatus for providing an image according to another embodiment includes a meta information parser that parses meta information about a free viewpoint relation, a viewpoint acquirer that acquires viewpoint information of a user, and a storage that stores a controller configured to control provision of an image on the basis of the acquired viewpoint information of the user and received meta information. In addition, the apparatus for providing an image includes a display that displays an image.

On the other hand, an embodiment according to the present invention provides a computer readable recording medium on which a meta information structure for a free viewpoint relation is stored. As described above, the meta information structure for the free viewpoint relation includes information about at least one view constituting an FVV. Information about each view includes information about a plurality of images constituting the corresponding view. The information about the plurality of images constituting the corresponding view includes meta information of a reference image and meta information of a surrounding image. The meta information of the reference image includes an identifier for the plurality of images, photographing position information of the reference image, relative position information of the reference image, and server information of the reference image. The meta information of the surrounding image includes an identifier for the plurality of images, position information of the camera, and relative position information of the surrounding image. In addition, the meta information of the surrounding image may include photographing position information of a view to which the surrounding image belongs.

The elements according to the embodiments of the present invention shown in FIGS. 1 to 5 may each be implemented in the form of software or in the form of hardware such as a field programmable gate array (FPGA) or an application specific integrated circuit (ASIC) and may perform predetermined functions.

However, the "elements" are not meant to be limited to software or hardware, and each of the elements may be stored in an addressable storage medium or may execute one or more processors.

Therefore, for example, the elements may include elements such as software elements, object-oriented software elements, class elements, and task elements, processes, functions, attributes, procedures, subroutines, segments of program code, drivers, firmware, microcode, circuits, data, databases, data structures, tables, arrays, and variables.

Elements and functions provided in corresponding elements may be combined into fewer elements or may be further divided into additional elements.

On the other hand, operations described with reference to FIGS. 2 and 5 may be further divided into additional operations or may be combined into fewer operations according to embodiments. In addition, some operations may be omitted if required, and the order thereof may be switched.

The embodiments of the present invention may be implemented in the form of a computer program stored in a medium to be executed by a computer or a recording medium including instructions executable by a computer. Computer-readable media may be any available media that may be accessed by a computer and include both volatile and nonvolatile media and both removable and non-removable media. The computer-readable medium may also include both computer storage media and communication media. The computer storage media includes volatile, nonvolatile, removable, and non-removable media implemented in any method or technology for storing information such as computer readable instructions, data structures, program modules or other data. The communication media typically includes computer readable instructions, data structures, program modules, or other types of data in a modulated data signal, such as a carrier wave, or another transmission mechanism, and any information delivery media.

Although the method and system according to the present invention have been described in relation to the specific embodiments, some or all of those elements or operations may be implemented using a computer system having a general purpose hardware architecture.

As is apparent from the above, the method of providing an image according to the embodiment of the present invention can provide a method and apparatus for providing a free viewpoint video on the basis of meta information that defines a free viewpoint relation in a network environment. Accordingly, a user at a remote site can view one piece of content at various viewpoints and the accessibility and convenience of use can be improved.

In addition, information required for free viewpoint video synthesis can be provided on the basis of respective parameters of meta information defining a free viewpoint relation.

The exemplary embodiments of the present invention are illustrative in nature, and those skilled in the art should appreciate that various modifications, changes, and substitutions thereto are possible without departing from the scope and spirit of the invention. Therefore, the exemplary embodiments disclosed in the present invention and the accompanying drawings are intended to illustrate and not limit the technical spirit of the present invention. For example, each element described as a single entity may be implemented in a distributed form, and elements described as being distributed may be implemented in a combined form.

The scope of the invention is set forth in the following claims rather than the above specification, and it is intended that the present invention covers all modifications provided they come within the scope of the appended claims and their equivalents.

What is claimed is:

1. A method of providing a plurality of images including a reference image and a surrounding image on the basis of meta information, the method comprising:
   acquiring photographing position information of the plurality of images;
   determining the reference image on the basis of the photographing position information;
   generating meta information of the reference image;
   generating meta information of the surrounding image; and
   transmitting the meta information of the reference image and the meta information of the surrounding image according to a request of a user,
   wherein the photographing position information includes arrangement information of a plurality of cameras that have photographed the plurality of images, information about a number of the cameras, position coordinate information of the cameras, dimension information of position coordinates of the cameras, and relative position information of the cameras, and
   wherein the arrangement information of cameras is information on the arrangement of the plurality of cameras photographing an object in various directions and at various positions.

2. The method of claim 1, wherein the meta information of the reference image includes an identifier for the plurality of images, the photographing position information, relative position information of the reference image, and server information of the reference image.

3. The method of claim 1, wherein the generating of the meta information of the surrounding image includes determining relative position information of the surrounding image with respect to the reference image on the basis of the photographing position information, wherein the meta information of the surrounding image includes the relative position information of the surrounding image.

* * * * *